United States Patent
Gordon et al.

(10) Patent No.: US 11,001,684 B2
(45) Date of Patent: May 11, 2021

(54) PUNCTURE HEALING ENGINEERED POLYMER BLENDS

(71) Applicant: U.S.A, as represented by the Administrator of the National Aeronautics and Space Administration, Washington, DC (US)

(72) Inventors: Keith L. Gordon, Hampton, VA (US); Emilie J. Siochi, Newport News, VA (US); Dennis C. Working, Norfolk, VA (US); Russell W. Smith, Hampton, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 522 days.

(21) Appl. No.: 14/956,026

(22) Filed: Dec. 1, 2015

(65) Prior Publication Data

US 2016/0152809 A1    Jun. 2, 2016

Related U.S. Application Data (60) Provisional application No. 62/254,563, filed on Nov. 12, 2015, provisional application No. 62/086,375, filed on Dec. 2, 2014.

(51) Int. Cl.
*C08J 5/18* (2006.01)
*C08K 7/14* (2006.01)
(Continued)

(52) U.S. Cl.
CPC ................ *C08J 5/18* (2013.01); *B29C 73/18* (2013.01); *C08J 3/005* (2013.01); *C08K 7/06* (2013.01);
(Continued)

(58) Field of Classification Search
CPC . C08J 5/18; C08J 3/005; C08J 2351/06; C08J 2471/00; C08J 2479/08;
(Continued)

(56) References Cited

U.S. PATENT DOCUMENTS 3,617,437 A   11/1971 Bagg
3,884,895 A    5/1975 Ecjert
(Continued)

OTHER PUBLICATIONS

Kalista, Jr., S., et al, "Effect of ionic content on ballistic self-healing in EMAA copolymers and ionomers", Mar. 19, 2013, RSC Publishing, The Royal Society of Chemistry Journal-Polymer Chemistry, vol. 4, Issue 18, pp. 4910-4926, obtained from http://pubs.rsc.org/en/content/articlepdf/2013/py/c3py00095h (Year: 2013).*
(Continued)

*Primary Examiner* — Brian Handville
(74) *Attorney, Agent, or Firm* — Jennifer L. Riley; Robin W. Edwards; Helen M. Galus (57) ABSTRACT

One aspect of the present invention is a puncture healing polymer blend comprising a self-healing first polymer material having sufficient melt elasticity to snap back and close a hole formed by a projectile passing through the material at a velocity sufficient to produce a local melt state in the first polymer material. The puncture healing polymer blend further includes a non-self-healing second material that is blended with the first polymer material. The blend of self-healing first polymer material and second material is capable of self-healing, and may have improved material properties relative to known self-healing polymers.

16 Claims, 3 Drawing Sheets

(51) Int. Cl.

| | |
|---|---|
| *C08K 7/06* | (2006.01) |
| *C08J 3/00* | (2006.01) |
| *B29C 73/18* | (2006.01) |
| *B32B 27/00* | (2006.01) |
| *F41H 3/00* | (2006.01) |
| *B64G 1/56* | (2006.01) |

(52) U.S. Cl.
CPC ............... *C08K 7/14* (2013.01); *B32B 27/00* (2013.01); *B32B 2262/101* (2013.01); *B32B 2262/106* (2013.01); *B32B 2270/00* (2013.01); *B32B 2307/304* (2013.01); *B32B 2307/51* (2013.01); *B32B 2307/762* (2013.01); *B64G 1/56* (2013.01); *C08J 2323/08* (2013.01); *C08J 2351/06* (2013.01); *C08J 2471/00* (2013.01); *C08J 2479/08* (2013.01); *F41H 3/00* (2013.01)

(58) Field of Classification Search
CPC ........ C08J 2323/08; B29C 73/18; B64G 1/22; C08K 7/06; C08K 7/14; B32B 2262/106; B32B 2307/762; B32B 2262/101; B32B 2270/00; B32B 2307/304; B32B 2307/51; B32B 27/00; F41H 3/00
See application file for complete search history.

(56) References Cited

U.S. PATENT DOCUMENTS

| | | |
|---|---|---|
| 4,656,105 A | 4/1987 | Ide |
| 5,344,689 A | 9/1994 | Eckert |
| 6,222,007 B1 | 4/2001 | Cano |
| 6,379,799 B1 | 4/2002 | Almen |
| 8,029,889 B1 | 10/2011 | Li |
| 9,156,957 B2 | 10/2015 | Gordon |
| 2010/0221523 A1 | 9/2010 | Hood |
| 2011/0124435 A1 | 5/2011 | Ehlers |
| 2016/0009845 A1 | 1/2016 | Gordon |
| 2016/0167811 A1 | 6/2016 | Gordon |

OTHER PUBLICATIONS

DuPont, DuPont(TM) Surlyn(R) Extrusion Guide, 2003, DuPont, pp. 1-21, obtained from http://www.nexeosolutions.com/wp-content/uploads/2014/07/surlyn_extrusion_guide_DuPont.pdf (Year: 2003).*
Gordon, K., et al, Puncture Self-healing Polymers for Aerospace Applications, Aug. 28, 2011, NTRS, obtained from https://ntrs.nasa.gov/search.jsp?R=20110015319 (Year: 2011).*
T. C. Mauldin & M R Kessler, Self-healing polymers and composites, 2010, International Materials Reviews, vol. 55: Issue 6, pp. 317-346, DOI: 10.1179/095066010X12646898728408 (Year: 2010).*
F. Rezaei, et al., Effect of fiber length on thermomechanical properties of short carbon fiber reinforced PP composites, obtained from https://ac.els-cdn.com/S0261306908001751/1-s2.0-S0261306908001751-main.pdf?_tid=501d216a-888a-49f0-987a-4341d36a06a6&acdnat=1536845479_42d32ef912ae383b5e51572190e5403f (Year: 2008).*
Grande, A.M., et al., "Effects of NA Neutralization Level on the SH Behaviour After Ballistic Tests of EMAA based Ionomers" from ICSHM2013: Fourth international conference on self-healing materials collection, Jun. 20, 2013, pp. 30-33, obtained from http://www.vliz.be/imisdocs/publications/265822.pdf (Year: 2013).*
Connell, John W., Smith, Jr., Joseph G., and Hergenrother, Paul M., "PETIs as High-Temperature Resin-Transfer-Molding Materials ," Sep. 1, 2005, obtained from https://www.techbriefs.com/component/content/article/tb/techbriefs/materials/255 (Year: 2005).*
divplast.com, "Diversified Plastics' components aboard NASA's Juno Spacecraft to Jupiter," obtained from https://divplast.com/diversified-plastics-components-aboard-nasas-juno-spacecraft-to-jupiter/ (Year: 2012).*
Warson, H, review of "Wool, Richard, 'Polymer Interfaces: Structure and Strength,' 1995 , Hanser/Gardner, Munich", Polymer Intl, 1995, pp. 305-306, vol. 38. No. 3.
White, S. R. et al., "Autonomic Healing of Polymer Composites," Nature Letters, Feb. 15, 2001, pp. 794-797, vol. 409.
Pang, J. W. C. et al., "'Bleeding Composites'—Damage Detection and Self-repair Using a Biomimetic Approach," Composites: Part A: Applied Science and Manufacturing, 2005, pp. 183-188, vol. 36.
Pang, J. W. C. at al., "A Hollow Fibre Reinforced Polymer Composite Encompassing Self-healing and Enhanced Damage Visibility," Composites Science and Technology, 2005, pp. 1791-1799, vol. 65.
Dry, Carolyn, "Passive Tuneable Fibers and Matrices," International Journal of Modern Physics B, Aug. 1992, pp. 2763-2771, vol. 6, Nos. 15-16.
Dry, Carolyn et al., "Three-part Methylmethacrylate Adhesive System as an Internal Delivery System for Smart Responsive Concrete," Smart Materials and Structures, 1996, pp. 297-300, vol. 5.
John, Manu et al., "Self-healing of Sandwich Structures with a Grid Stiffened Shape Memory Polymer Syntactic Foam Core," Smart Materials & Structures, 2010, pp. 1-12, 075013-075024, vol. 19.
Jones, Nji et al., "A Self-healing 3D Woven Fabric Reinforced Shape Memory Polymer Composite for Impact Mitigation," Smart Materials & Structures, 2010, pp. 1-9, 035007-035015, vol. 19.
Meure, Sam et al., "Poly[ethylene-co-(methacrylic acid)] Healing Agents for Mendable Carbon Fiber Laminates," Macromol. Mater, Eng., 2010, pp. 420-424, vol. 295.
Chen, Xiangxu et al., "New Thermally Remendable Highly Cross-Linked Polymeric Materials," Macromolecules, 2003, pp. 1802-1807, vol. 36.
Chen, Xiangxu et al., "A Thermally Re-mendable Cross-linked Polymeric Material," Science, Mar. 1, 2002, pp. 1698-1702. vol. 295.
Wojtecki, Rudy J. et al., "Using the Dynamic Bond to Access Macroscopically Responsive Structurally Dynamic Polymers," Nature Materials, Jan. 2011. pp. 14-27, vol. 10.
Cheng, Shijing et al., "Taking Advantage of Non-covalent interactions in the Design of Self-healing Polymers," Polymer Preprints (American Chemical Society, Division of Polymer Chemistry) , 2008, pp. 978-979, 49(1).
Cordier, Philippe et al., "Self-healing and Thermoreversible Rubber From Supramolecular Assembly," Nature, Feb. 21, 2008, pp. 977-980, vol. 451.
Canadell, Judit et al., "Self-healing Materials Based on Disulfide Links," Macromolecules, 2011, pp. 2536-2541, vol. 44.
Burnworth, Mark et al., "Optically Healable Supramolecular Polymers," Nature, Apr. 21, 2001, pp. 334-337, vol. 472.
Deng, Guohua et al., "Covalent Cross-Linked Polymer Gels with Reversible Sol-Gel Transition and Self-Healing Properties," Macromolecules, 2010, pp. 1191-1194, vol. 43.
Smith, Joseph G., Jr. "An Assessment of Self-Healing Fiber Reinforced Composites," NASA/TM-2012-217325, Jan. 2012, pp. 1-23.
Lantman, C. W. et al., "Structural Properties of Ionomers," Annual Review of Materials Science, 1989, pp. 295-317, vol. 19.
Hird, B. at al., "Sizes and Stabilities of Multiplets and Clusters in Cerboxylated and Sulfonated Styrene Ionomers," Macromolecules, 1992, pp. 6466-6474, vol. 25.
Kalista, Stephen, Jr., "Self-Healing of Thermoplastic Poly (Ethylene-co-Methacrylic Acid) Copolymers Following Projectile Puncture," Thesis to Virginia Polytechnic Institute and State University, Sep. 1, 2003, pp. 1-67, Blacksburg, VA.
Fall, Rebecca, "Puncture Reversal of Ethylene Ionomers—Mechanistic Studies." Technical Paper to Virginia Polytechnic Institute and State University, Aug. 29, 2001, pp. 1-65, Blacksburg, VA.
Varley, Russell J. at al., "Towards an Understanding of Thermally Activated Self-healing of an Ionomer System during Ballistic Penetration," Acta Materialia, 2008, pp. 5737-5750, vol. 56.
Varley, Russell J. et al., "Autonomous Damage Initiated Healing in a Thermo-responsive Ionomer," Polymer International. 2010, pp. 1031-1038, vol. 59.
Gordon, Kristina et al., "Puncture Healing Structural Polymers," Not Published Yet.

(56) References Cited

OTHER PUBLICATIONS

Rojdev, K., et al., "Advanced Multifunctional MMOD Shield: Radiation Shielding Assessment," AIAA, 43rd International Conference on Environmental Systems, Jul. 14-18, 2013, pp. 1-10.
NASA, "Orbital Debris Shielding," website: http://orbitaldebris.jsc.nasa.gov/protect/shielding.html.

* cited by examiner

Fig. 3B

PUNCTURE HEALING ENGINEERED POLYMER BLENDS

CROSS-REFERENCE TO RELATED APPLICATION(S)

This patent application claims the benefit of and priority to U.S. Provisional Patent Application No. 62/086,375 titled "Puncture Healing Polymer Blends" filed on Dec. 2, 2014, and to U.S. Provisional Patent Application No. 62/254,563 titled "Puncture Healing Engineered Polymer Blends" filed on Nov. 12, 2015, wherein the contents of each cross-referenced application is hereby incorporated by reference in its entirety.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

FIELD OF THE INVENTION

This invention relates to a blend of self-healing polymers and non self-healing polymers, and a method of forming such polymer blends. The polymer blends of the present invention self-heal when penetrated at a very rapid rate, and have improved material properties relative to known self-healing polymers formed from a single polymer material.

BACKGROUND OF THE INVENTION

Self-healing materials have the ability to mitigate incipient damage, and have a built-in capability to substantially recover structural load bearing capacity after damage. Different "self-healing mechanisms" have been identified in materials as a collection of irreversible thermodynamic paths whereby the path sequences ultimately lead to crack closure or resealing. One mechanism comprises crack repair in polymers using thermal and solvent processes, where the healing process is triggered with heating or with a solvent. Another approach involves autonomic healing concepts, wherein healing is accomplished by dispersing a microencapsulated healing agent and a catalytic chemical trigger within an epoxy resin to repair or bond crack faces and mitigate further crack propagation. A related approach, the microvascular concept, utilizes brittle hollow glass fibers (in contrast to microcapsules) filled with an epoxy hardener and uncured resins in alternating layers, with fluorescent dye. An approaching crack ruptures the hollow glass fibers, releasing healing agent into the crack plane through capillary action. Yet another approach utilizes a polymer that can reversibly re-establish its broken bonds at the molecular level, by either thermal activation (i.e., based on Diels-Alder re-bonding), or ultraviolet light. Yet another approach utilizes structurally dynamic polymers, which are materials that produce macroscopic responses from a change in the materials' molecular architecture without heat or pressure. Yet another approach involves integrating self-healing resins into fiber reinforced composites to provide self-healing fiber reinforced composites. Various chemistries have been utilized in connection with the aforementioned approaches.

However, known self-healing approaches may suffer from various disadvantages such as slow rates of healing. Also, the use of foreign inserts into a polymer matrix may have detrimental effects on the composite fiber performance. Furthermore, in some cases the materials have to be held in direct contact, or under load, and/or fused together with high temperature for relatively long periods of time. Still further, known methods may not fully address damage incurred by ballistic or hyper velocity impacts, and also may not provide sufficient load bearing strength capabilities.

BRIEF SUMMARY OF THE INVENTION

One aspect of the present invention is a puncture healing polymer blend comprising a self-healing first polymer material. The first polymer material may have sufficient melt elasticity to snap back and close a hole formed by a projectile passing through the material at a velocity sufficient to produce a local melt state in the first polymer material. The puncture healing polymer blend further includes a non-self-healing second material that is blended with the first polymer material. The blend of self-healing first polymer material and second material is capable of self-healing. The polymer blend may be capable of self-healing over a temperature range that is greater than the self-healing temperature range of the first polymer material. The first polymer material may comprise a copolymer having ionic groups. In particular, the copolymer may comprise molecules defining a polymer backbone, and the ionic groups may be distributed along the polymer backbone. The ionic groups may have a concentration of less than about 15 mol %. The second material may comprise a polymer that is no more than about 10% by weight of the polymer blend. Also, the first polymer material may comprise a copolymer having no ionic groups. In particular, the copolymer may comprise molecules defining a polymer backbone. The second material may comprise a polymer that is no more than about 10% by weight of the polymer blend. Alternatively, the first polymer may comprise a self-healing polymer (e.g. Dow Affinity EG8200G Polyolefin Elastomers, available from Dow Chemical Company of Midland, Mich., or Barex® 210 IN, available from INEOS Barex of Rolle, Switzerland) that does not have an ionic group.

Another aspect of the present invention is a method of making a puncture healing polymer blend. The method includes providing a self-healing first polymer material having sufficient melt elasticity to snap back and close a hole formed by a projectile passing through the material at a velocity sufficient to produce a local melt state in the first polymer material. The first polymer material defines a first melt temperature. A second polymer material is also provided. The second polymer material is non self-healing, and defines a second melt temperature. The first and second polymer materials are mixed, and the first and second polymer materials are heated to a temperature that is at least as great as the lowest of the first and second melt temperatures. The method may include defining a target mix temperature, and causing a temperature of the first and second polymer materials to ramp above and below the target mix temperature while the first and second polymer materials are being mixed.

These and other features, advantages, and objects of the present invention will be further understood and appreciated by those skilled in the art by reference to the following specification, claims, and appended drawings.

DETAILED DESCRIPTION OF THE INVENTION

Figures 2A, 2B:
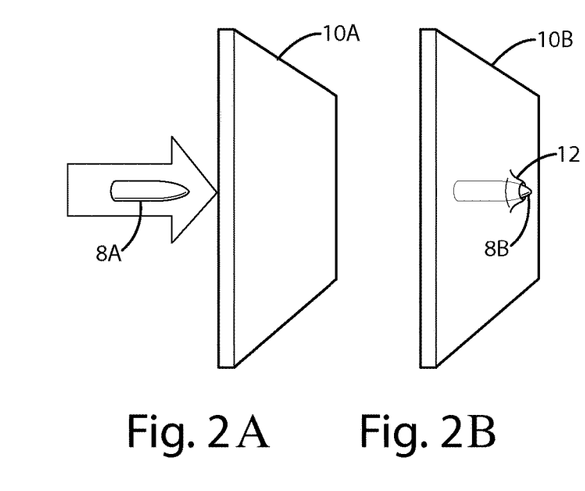
FIG. 2A is a partially schematic isometric view showing a projectile immediately prior to contact with a sheet/plate/panel of material comprising a puncture healing polymer blend according to one aspect of the present invention.
FIG. 2B is a partially schematic isometric view showing a projectile passing through a sheet/plate/panel of material comprising a puncture healing polymer blend according to one aspect of the present invention.

For purposes of description herein, the terms "upper," "lower," "right," "left," "rear," "front," "vertical," "horizontal," and derivatives thereof shall relate to the invention as oriented in FIG. 2A. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
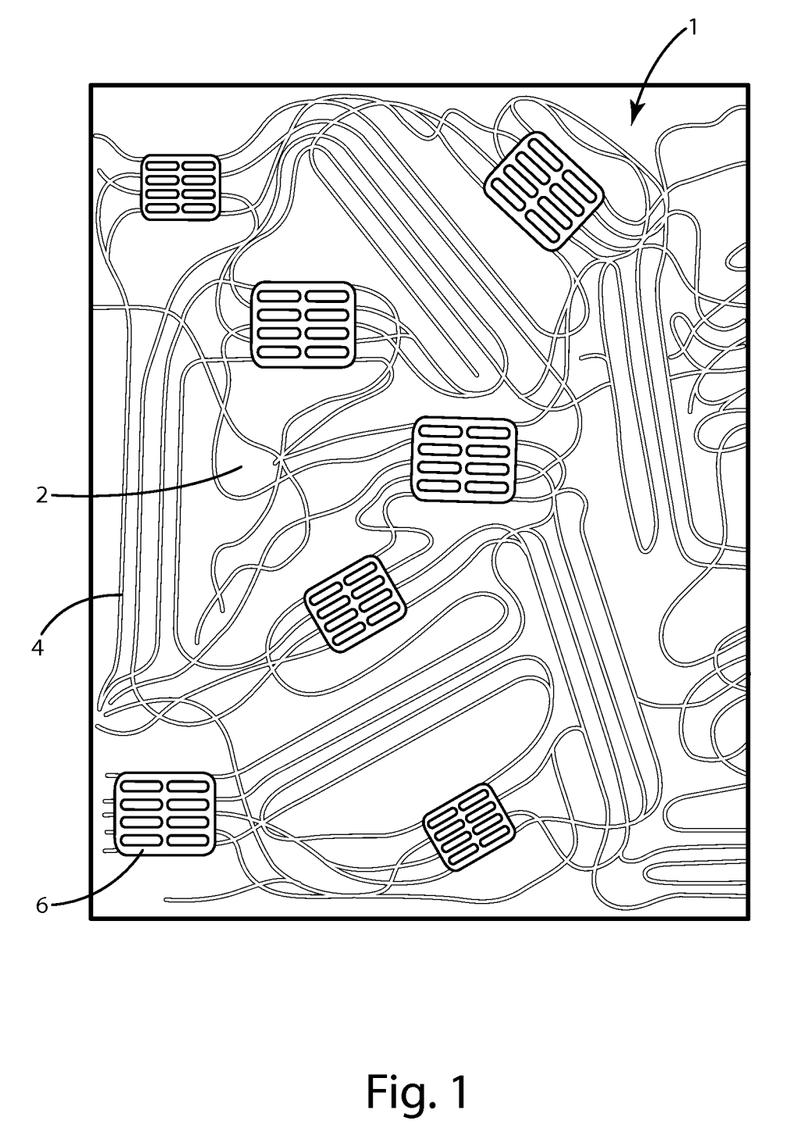
FIG. 1 is partially schematic view of a self-healing copolymer material including amorphous regions, crystalline regions, and ionic clusters.

The present invention generally relates to puncture healing engineered melt formulations consisting of a non self-healing polymer and a self-healing polymer that have been blended together. Various self-healing polymers, such as, for example commercially available Surlyn® copolymers, are known. With reference to FIG. 1, a Surlyn® copolymer 1 includes amorphous regions 2, crystalline regions 4, and ionic clusters 6.

In general, ionomers contain ionic groups or clusters 6 at low concentrations (<15 mol %) along the polymer backbone. In the presence of oppositely charged ions, these ionic clusters or groups 6 form aggregates that can be activated by external stimuli such as temperature or ultraviolet irradiation. For example, poly(ethylene-co-methacrylic acid) (EMMA) (Surlyn®) undergoes puncture reversal (self-healing) following high velocity ballistic penetration (300 m/s-5 km/sec). The heat generated from the damage event triggers self-healing in this material. Ballistic testing of EMAA copolymers with ionic segments has confirmed that these materials have self-healing properties. Although EMMA polymers possess excellent puncture healing properties, these materials were not originally envisioned for such a use. The puncture-healing behavior/properties result from the combination of viscoelastic properties under the conditions induced by projectile penetration. As discussed in more detail below, several other known polymers also have puncture healing functionality.

Figures 2C, 2D:
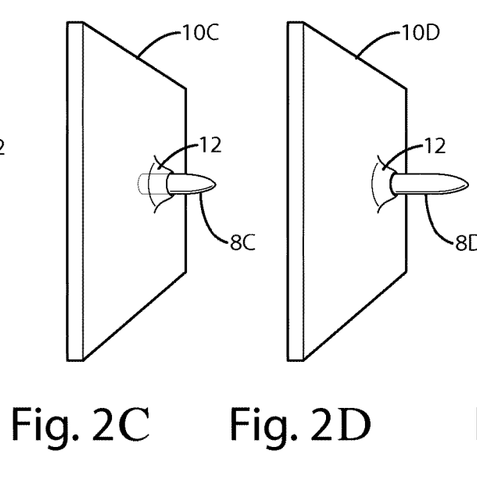
FIG. 2C is a partially schematic isometric view showing a projectile passing through a sheet/plate/panel of material comprising a puncture healing polymer blend according to one aspect of the present invention.
FIG. 2D is a partially schematic isometric view showing a projectile passing through a sheet/plate/panel of material comprising a puncture healing polymer blend according to one aspect of the present invention.
Figure 2E:
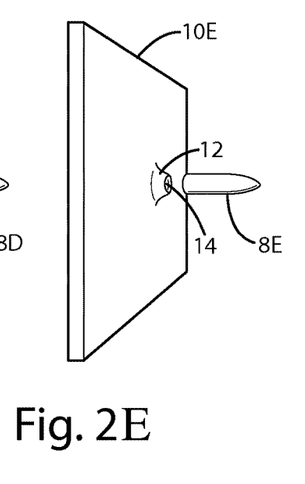
FIG. 2E is a partially schematic isometric view showing a projectile immediately after passing through a sheet/plate/panel of material comprising a puncture healing polymer blend according to one aspect of the present invention.
Figure 2F:
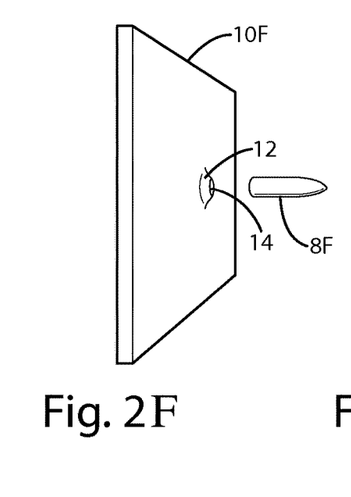
FIG. 2F is a partially schematic isometric view showing a projectile immediately after passing through a sheet/plate/panel of material comprising a puncture healing polymer blend according to one aspect of the present invention.
Figure 2G:
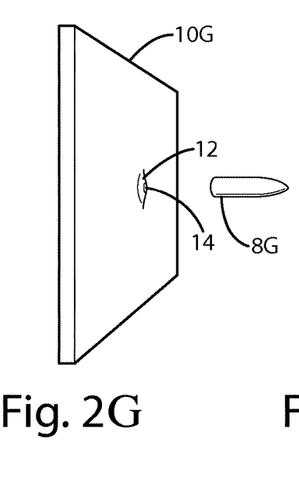
FIG. 2G is a partially schematic isometric view showing a projectile immediately after passing through a sheet/plate/panel of material comprising a puncture healing polymer blend according to one aspect of the present invention.
Figures 2H, 2I:
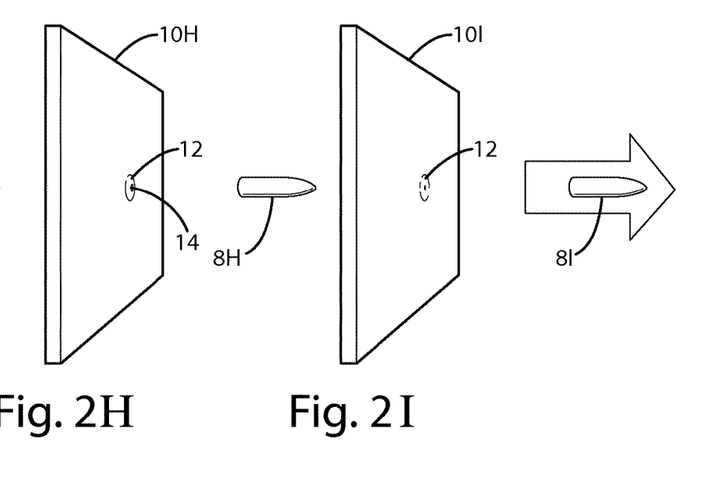
FIG. 2H is a partially schematic isometric view showing a projectile immediately after passing through a sheet/plate/panel of material comprising a puncture healing polymer blend according to one aspect of the present invention.
FIG. 2I is a partially schematic isometric view showing a projectile immediately after passing through a sheet/plate/panel of material comprising a puncture healing polymer blend according to one aspect of the present invention.

FIGS. 2A-2I are partially schematic isometric views showing a projectile 8 passing through a sheet/plate/panel 10 of puncture healing material. The projectile 8 and sheet/plate/panel 10 are designated 8A-8I and 10A-10I in FIGS. 2A-2I, respectively. The sheet/plate/panel 10 may comprise a blend of self-healing polymers and non-self-healing polymers according to the present invention. Puncture healing in these materials is the result of the viscoelastic properties that the self-healing polymers possess. Self-healing behavior occurs upon projectile puncture whereby energy is transferred to the material during impact both elastically and inelastically. In general, puncture healing may occur if the puncture event produces a local melt state 12 in the polymer material at the opening 14 and if the molten material 12 has sufficient melt elasticity to snap back and close the hole 14 (FIG. 2I). Previous ballistic testing studies revealed that Surlyn® materials heated to a temperature of –98° C. during projectile puncture (3° C. higher than its melting temperature). However, more recent ballistic testing studies have revealed that Surlyn® materials heated to a temperature –240° C. during projectile puncture. The temperature increase produces a localized flow state and via the melt elasticity phenomena, causes snap back, thus closing the hole 14 (FIG. 2I). High speed video testing has shown that the mechanism of healing for known self-healing polymers begins when the tip of the projectile 8 punches a hole 14 into the panel or sheet/plate/panel 10 as it penetrates, with polymeric material being pushed out in front of the projectile 10 as it exits (FIGS. 2D-2E). The strong force of the impact causes stress waves to propagate through the material of sheet/plate/panel 10 in a radial direction away from the projectile 8, wherein the modal wave pushes the material uniformly outward initially, but then upon reflection at the edges of the sheet/plate/panel 10, the wave is reversed and pushes uniformly inward. The heat generated by the penetration of the projectile 8 facilitates self-healing as the material 12 around the penetration site or hole 14 melts and flows to close the hole (FIG. 2I). In general, the melted material 12 of a polymer blend according to the present invention flows back and closes the hole 14 almost instantaneously, typically in less than 100 ms. Some blends according to the present invention may comprise polymers that close somewhat slower (e.g. 200 ms), but it will be understood that the hole 14 generally closes at a very rapid rate.

In contrast to known self-healing polymers consisting of a single polymer material, the puncture healing melt blends of the present invention comprise a blend or mixture of self-healing polymers and non-self-healing polymers. These blends may be made by melt blending self-healing polymers with non-self-healing polymeric materials. Examples of self-healing polymeric materials include Surlyn® 8940, Affinity™ EG 8200 G, and poly(butadiene)-graft-poly (methyl acrylate-co-acrylonitrile) or Barex™ 210 IN. Examples of non-self-healing polymeric materials include poly(ether ether ketone) PEEK, LaRC phenyl ethynyl terminated imide 330 LaRC PETI 330, and Raptor Resins Bismaleimide-1 (BMI-1). Puncture healing blends according to the present invention may optionally include chopped glass and/or chopped carbon fibers that are mixed with the self-healing and non-self-healing polymers.

Melt blends according to the present invention may have varying compositions to optimize the desired properties of the resulting matrix. According to one specific example, melt blends of the polymers were processed using a C.W. Brabender, Inc. PL2000 Plasticorder with a 30 cc half size electrically heated single zone mixing head. Melt processed blends were processed at 50 RPM under nitrogen purge. Temperatures were ramped up and down from the target mix temperature in order to achieve the different material properties. In general, the target mix temperature is at least as great as the highest melt temperature of the materials being blended.

Ballistic testing was conducted to determine the self-healing characteristics of several polymer blends according to the present invention. To obtain dynamic damage measurements for the polymer blends (i.e. to simulate micro-meteoroid damage) 7.6 cm×7.6 cm sheets/plates/panels 10 (FIGS. 2A-2I) were fabricated of the melt blends at a thickness of approximately 4.9 mm. The sheets 10 were impacted with 5.56 mm×45 NATO M193 (FMJ) projectiles 8 that were off loaded to achieve an average projectile velocity of 920 meters per second (m/s) (or nominally 3000 feet per second). The sheets 10 of polymer blends were shot (impacted) at temperatures of 25° C., 50° C., and 100° C. to determine the temperature range of healing. According to one predefined criteria, a polymer blend was determined to be self-healing if the hole 14 created by the projectile 8 closed after penetration. Self-healing was also validated by a secondary vacuum leak test method. The set-up consisted of a tube (not shown) connected to a vacuum pump, attached with a fixture, which applied suction at the site of penetration of the impacted sheets/plates/panels 10. Vacuum was pulled on the impact site down to 1 Torr and the pump was shut off. If vacuum suction was maintained for a minimum of sixty minutes after the vacuum pump was shut off, then the tested sheets/plates/panels were determined to have self-healed. The process was validated beforehand with pristine non-impacted sheets/plates/panels. Also, to further quantify the self-healing tendencies of the blends residual strength tests were conducted. The tensile tests were performed using dogbone specimens cut from neat polymer sheets/plates/panels and previously impacted sheets/plates/panels according to ASTM-D638. To obtain mechanical properties, an Axial-Torsional Material Test System (MTS) with Skip MTS 647 hydraulic grips with diamond pattern wedges was utilized. A MTS Flex test XE Controller with MTS Multipurpose Testware software was used to create, control, and collect data on the tests. The ramp rate in axial stroke control was 0.050 in/min. with a continuous data sample rate of 2 Hz. Data was collected on channels which recorded time, load and stroke, as well as maximum/minimum time. Approximately 1 inch of the specimen was placed in upper and lower grip wedges resulting in a specimen gage length of 1 inch (i.e. the total dogbone test specimen length was 3 inches).

Table 1 lists the puncture healing melt blend formulations and residual tensile strengths and pressure testing results for several blends according to the present invention.

TABLE 1

| Polymer | Test Temp (° C.) | Residual Strength (%) | Pressure Test (mins.) | Hole Diameter (mm) |
|---|---|---|---|---|
| Surlyn ®/5% PETI330 proc. @ 250° C. | 100 | 80 | 60 | 0.54 |
| Surlyn ®/10% PETI330 proc. @ 250° C. | 100 | 72 | 60 | 0.82 |
| Surlyn ®/10% PETI330 proc. @ 365° C. | 100 | 73 | 60 | 0.99 |
| Surlyn ®/5% wt. chopped glass fiber | 25 | 74 | 60 | 1.43 |
|  | 50 | 69 | 60 | — |
| Surlyn ®/10% wt. chopped glass fiber | 25 | 75 | 60 | 1.49 |
|  | 50 | 77 | 60 | 1.60 |
| Surlyn ®/25% wt chopped graphite fiber | 25 | 57 | 60 | 1.50 |
| 90% Surlyn ®/10% PEEK | 100 | 82 | 60 | 0.98 |
| 95% Surlyn ®/5% BMI | 100 | 83 | 60 | 0.48 |
| 90% Affinity EG8200G/10% PETI330 | 25 | 100 | 60 | 1.01 |
| 95% Affinity EG8200G/5% BMI | 25 | 100 | 60 | 0.95 |
|  | 50 | 97 | 60 | 0.89 |
| 90% Affinity EG8200G/10% BMI | 25 | 96 | 60 | 0.95 |
| 95% Affinity EG8200G/5% Barex 210 IN | 25 | 100 | 60 | 1.02 |
|  | 50 | 99 | 43 | 0.94 |
| 90% Affinity EG8200G/10% Barex 210 IN | 25 | 90 | 60 | 0.84 |
|  | 50 | 98 | 30 | 1.32 |

As shown in Table 1, the puncture healing polymeric melt blends of the present invention demonstrate a self-healing capability over a wider temperature range than that of known self-healing compositions. Also, the puncture healing capability of the melt blends improves with temperature. The puncture healing melt blends may be utilized for improved damage tolerance in load bearing structures and as a means of self-mitigation/reliability with respect to overall vehicle health and structural durability. Furthermore, the puncture healing melt blends may be utilized in space vehicles and other such applications.

Puncture healing blends according to the present invention may be infused with carbon fiber into CFRP to produce self-healing materials. Structures that make use of this approach produce a healing response from a change in the material's chain mobility as a function of the damage mechanism/conditions involved and induced. This type of material possesses better mechanical properties, healing capability at elevated temperatures, faster healing rates (typically less than 100 microseconds), and healing without the need of foreign inserts or fillers (via structural chemistry). These materials may be utilized in aircraft and aerospace applications as well as in other pressure loaded type structures.

Structures utilizing self-healing polymer matrices offer the following advantages: 1) increased damage tolerance compared to State-of-the-Art (SOA) thermosetting polymer matrices which incur a greater extent of impact damage compared to composites developed with these materials. 2) Self-repairing polymer matrices provide a route for recovery of a large proportion of the pristine mechanical properties, thus extending the life of the structure. 3) Since self-healing is an intrinsic property of the matrix material, the matrix can be treated as a direct substitute to conventional thermosetting matrices that do not possess self-healing characteristics.

4) The intrinsic healing of the outlined novel melt formulations does not require the introduction of microcapsules needed by other healing polymer matrices described in the prior art section; therefore, it has the advantage of not needing microcapsules which may act as defect initiators in the composite. 4) As long as there is no significant loss of matrix material mass incurred during the damage event, these materials can self-heal repeatedly, compared to the microcapsule approach, where healing is limited by the amount of monomer present at the site where damage occurs.

Potential applications for puncture healing materials include, but are not limited to, the following: 1) space habitats/structures MMOD protective liners; 2) radiation shielding; 3) fuel tank liners; 4) encasing for hydraulics; 5) healing layer in ballistic protection/armor; 6) encasings for fuel lines; 7) helmets/head protection and/or protective equipment in high contact sports; 8) packaging material for foods and etc.; 9) human prosthetics; and 10) wire insulation material.

Figure 3A:
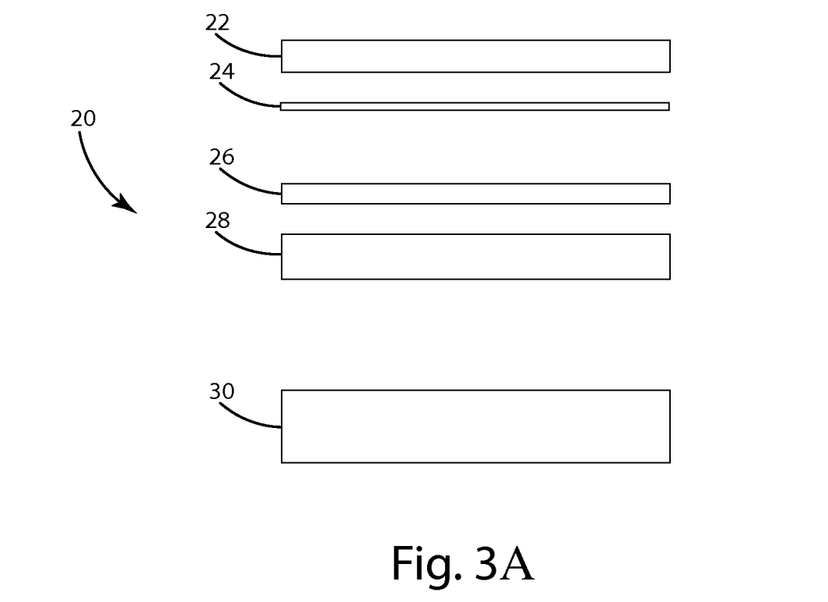
FIG. 3A is an exploded schematic view of an impact shield structure according to one aspect of the present invention.
Figure 3B:
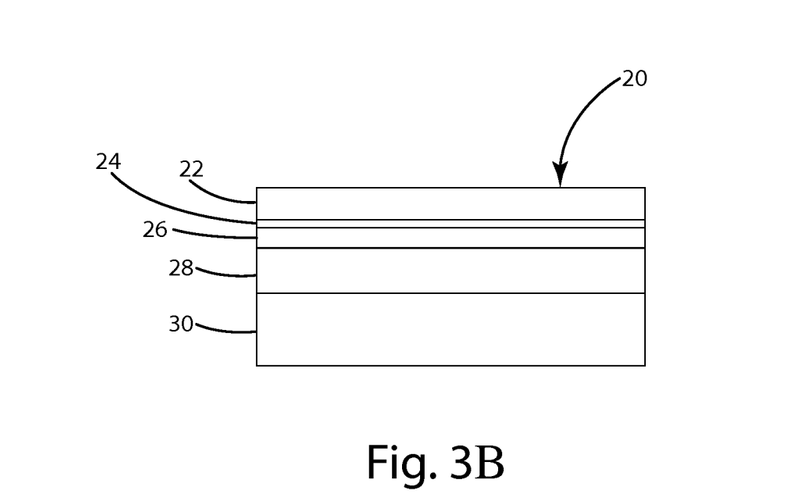
FIG. 3B is a schematic view of the impact shield structure of FIG. 3A.

As humans explore further into deep space, multifunctional materials may be utilized to decrease complexity and mass. One area where multifunctional materials according to the present invention may be beneficial is in micrometeoroid and orbital debris (MMOD) shields. With reference to FIGS. 3A and 3B, a MMOD shield 20 according to one aspect of the present invention may comprise a stuffed Whipple shield consisting of layers 22, 24, 26, 28, and 30. Layer 22 comprises a bumper, and layer 24 comprises a thermal blanket or multi-layer insulation (MLI). Layers 26 and 28 comprise intermediate layers that may be made from known materials, and layer 30 comprises a rear wall.

The MLI layer 24 may include one or more layers of material comprising one or more self-healing polymer blends according to the present invention. The self-healing capabilities of the MLI layer 24 provides significant advantages. Increasing the MMOD effectiveness of MLI blankets 24, while still preserving their thermal capabilities, allows for a less massive MMOD shield. Increased effectiveness of the MLI blanket 24 is realized as a result of adding a puncture healing engineered blend as a multifunctional layer to the MLI 24. The puncture healing layer serves a dual purpose as a protective liner and radiation shield, thus allowing for a less massive MMOD shield 20. The puncture healing engineered blends described herein may comprise polymers such as Surlyn® 8940 and Affinity™ EG8200G, which are primarily made up of polyethylene. Polyethylene is a known radiation shielding material whereby the MLI layer 24 has radiation shielding capabilities and self-healing properties. Utilizing advanced shielding concepts may provide a reduction of up to 50% in mass.

It is to be understood that variations and modifications can be made on the aforementioned structure without departing from the concepts of the present invention, and further it is to be understood that such concepts are intended to be covered by the following claims unless these claims by their language expressly state otherwise.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

What is claimed is:

1. A puncture healing polymer blend, comprising:
    a self-healing first polymer material in an amount from about 90 wt % to about 95 wt % having sufficient melt elasticity to snap back and close a hole formed by a projectile passing through the material at a velocity sufficient to produce a local melt state in the first polymer material;
    a second polymer material in an amount from about 10 wt % to about 5 wt % blended with the first polymer material, wherein the second polymer material is non self-healing, wherein the second polymer material is a poly(ether ether ketone), a phenyl ethynyl terminated imide, or a bismaleimide; and wherein:
    the puncture healing polymer blend is capable of self-healing.

2. The puncture healing polymer blend of claim 1, wherein:
    the self-healing first polymer material is only self-healing when the first polymer material is within a first temperature range;
    the puncture healing polymer blend is self-healing over a second temperature range that is greater than the first temperature range.

3. The puncture healing polymer blend of claim 1, wherein:

the self-healing first polymer material comprises a copolymer with ionic groups.

4. The puncture healing polymer blend of claim 3, wherein:
the copolymer comprises molecules defining polymer backbones, and wherein the ionic groups are distributed along the polymer backbones.

5. The puncture healing polymer blend of claim 4, wherein:
the ionic groups have a concentration of less than about 15 mol %.

6. The puncture healing polymer blend of claim 1, wherein:
the self-healing first polymer material comprises poly (ethylene-co-methacrylic acid).

7. The puncture healing polymer blend of claim 1, wherein:
the self-healing first polymer material comprises a polyolefin plastomer.

8. The puncture healing polymer blend of claim 1, wherein:
the second polymer material comprises about 10% by weight of the polymer blend.

9. The puncture healing polymer blend of claim 1, wherein:
the second polymer material comprises chopped carbon fibers.

10. The puncture healing polymer blend of claim 1 wherein:
the self-healing first polymer material comprises a copolymer with ionic groups.

11. A sheet of material formed from a puncture healing polymer blend of claim 1.

12. The sheet of material of claim 11, wherein:
the self-healing first polymer material is only self-healing when the first polymer material is within a first temperature range;
the puncture healing polymer blend is self-healing over a second temperature range that is greater than the first temperature range.

13. The sheet of material of claim 11, wherein:
the self-healing first polymer material comprises a copolymer with ionic groups.

14. The sheet of material of claim 13, wherein:
the copolymer comprises molecules defining polymer backbones, and wherein the ionic groups are distributed along the polymer backbones.

15. The puncture healing polymer blend of claim 1, wherein the second polymer material is a poly(ether ether ketone).

16. The puncture healing polymer blend of claim 1, wherein the second polymer material is a phenyl ethynyl terminated imide.

* * * * *